Figure 2:
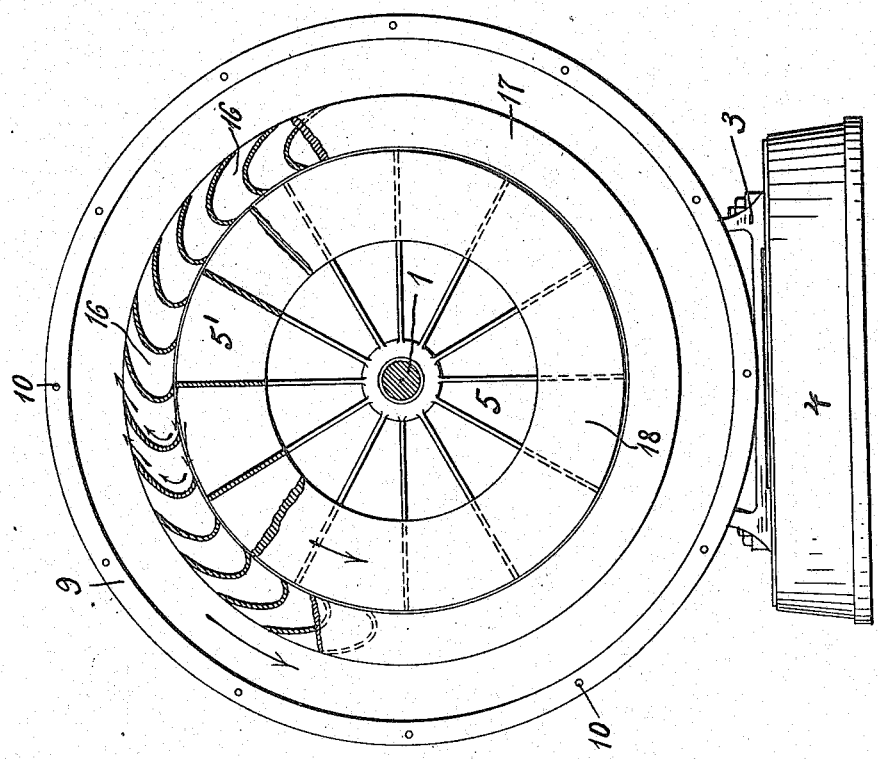

C. R. RADCLIFFE.
HYDRAULIC POWER TRANSMITTING APPARATUS.
APPLICATION FILED JUNE 28, 1907.

1,122,302.

Patented Dec. 29, 1914.

WITNESSES
Arthur Ormay
S. Birnbaum

INVENTOR
Carlton R. Radcliffe
by Sigmund Herzog
his ATTORNEY

UNITED STATES PATENT OFFICE.

CARLTON R. RADCLIFFE, OF NEW YORK, N. Y., ASSIGNOR, BY MESNE ASSIGNMENTS, TO THE SCIENTIFIC RESEARCH CO., OF NEW YORK, N. Y., A CORPORATION OF NEW YORK.

HYDRAULIC POWER-TRANSMITTING APPARATUS.

1,122,302.     Specification of Letters Patent.     Patented Dec. 29, 1914.

Application filed June 28, 1907. Serial No. 381,342.

*To all whom it may concern:*

Be it known that I, CARLTON R. RADCLIFFE, a citizen of the United States of America, and a resident of the city of New York, in the county of New York and State of New York, have invented certain new and useful Improvements in Hydraulic Power-Transmitting Apparatus, of which the following is a specification.

The present invention relates to power transmission apparatus, and more particularly to hydraulic power transmission devices, by means of which the rotation of the driving member is imparted to the driven member through the intermediary of a suitable fluid medium.

The transmission of power is usually effected by means of positive-, friction- or fluid-clutches, and usually with some objectionable jar or shock. Since in clutches of this general character the driven member is in its state of rest and the driving member may rotate at a certain speed when engaging the driven member, it will be seen that shocks and jars arise, when the driven member changes its speed suddenly from zero to the speed of the driving member. Another serious defect of devices of the character mentioned above consists in the fact that certain parts of the transmission are always in contact and wear, decreasing thus the efficiency of the device. The connection between the members of the transmitting apparatus of this character being positive, it will be observed that the speed of the driven member is necessarily equal to the speed of the driving member, therefore not directly within the control of the operator.

It is now the object of the present invention to provide a hydraulic power transmitting apparatus, the driving and driven members of which rotate independently of each other, or in other words are not positively connected, and the rotation of the one member is imparted to the other member by a suitable fluid. It will be observed that no shock or jar can occur, since there is no positive connection between the rotating elements, and the speed of one member is gradually imparted to the other.

There being no direct connection between the rotating driving and driven members, it is obvious that it will be impossible to overload or stall the prime mover; on the other hand, the driven member automatically adjusts itself to the load; thus doing the work at the most economical speed and also at the fastest rate possible.

The defect of the wear and tear is entirely obviated in the device of the present invention, there being no direct connection between the rotating parts.

Means may be also provided whereby the speed of the driven member may be varied.

A still further object of the invention is to provide a fluid power transmitting apparatus, which will automatically yield when the driven member encounters an obstruction greater than a predetermined strain, thus adapting the device for use with continuously operating prime movers without danger of injury to the machinery driven thereby, should the latter be abnormally obstructed or resisted.

Broadly speaking, the invention consists of a driving member and of a driven member inclosing said driving member; a suitable fluid of constant volume is contained in said driven member and transmits power from the said driving member to said driven member.

Going more into details, the device may be described as follows: An impeller of a centrifugal pump is secured to a shaft, driven by any suitable source of power. Upon the same shaft is loosely mounted a closed casing, inclosing said impeller and provided with a plurality of vanes, similar to the vanes of the runner of an ordinary turbine. The casing is filled with a suitable fluid, such as water, glycerin, oil or mercury, etc. It is obvious that in rotating the shaft and the impeller secured thereto, a motion is imparted to the fluid, contained in the casing; the fluid enters the "eye" of the impeller, and when in the "eye," partakes of the rotary motion of the vanes. The rotation and the centrifugal force created thereby imparts a velocity of whirl to the fluid and, on leaving the vanes, it will possess a considerable amount of kinetic energy in virtue of its velocity of whirl and radial velocity. In other words the impeller will mechanically generate a "head." The kinetic energy of the water is then converted into useful work. A plurality of jets or streams flow from the vanes of the impeller to the vanes of the runner, secured in any suitable manner to the casing, inclosing the impeller. The streams impinge on the vanes of the runner, imparting rotation to the same. It will be seen that this hydraulic power transmitting apparatus is a turbine, the guide blades of which are rotated and create thereby mechanically the head operating the same.

Suitable means are provided, whereby the speed of the driven member may be varied from zero practically to the speed of the driving member by maintaining the speed of the driving member. Since the speed of the driving member may be also varied by regulating the speed of the prime mover, to which the same is coupled, it will be seen that a wide range of speeds may be obtained.

The invention is illustrated in the accompanying drawings, in which—

Figure 1:
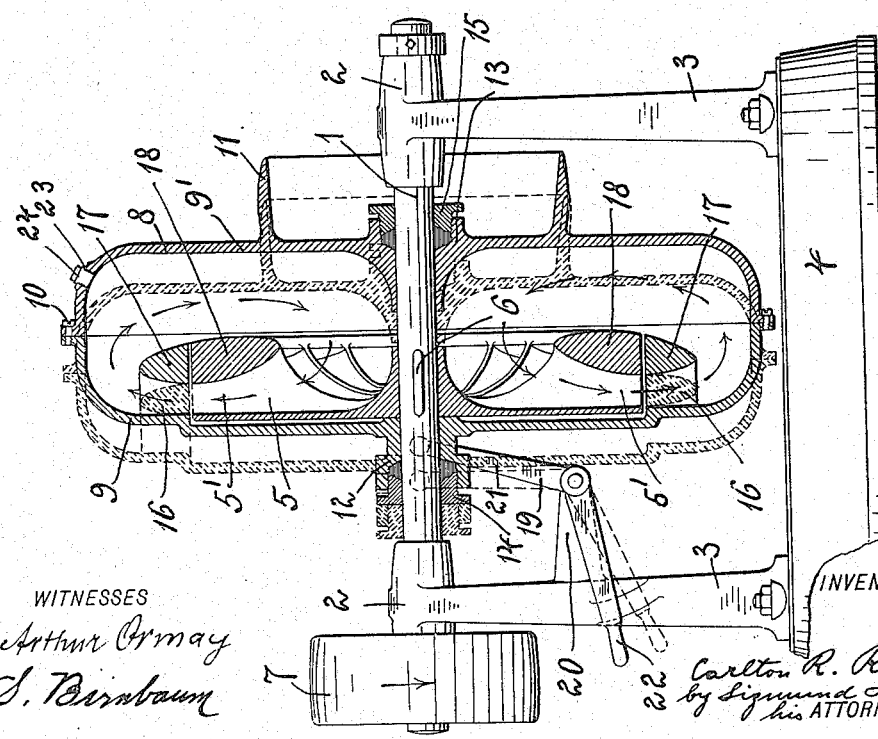

Figure 1 is a cross section of the apparatus parallel to the axis, and Fig. 2 a section through the buckets of the driving and driven members at right angles to the axis of the shaft of the apparatus.

1 indicates a shaft journaled in the bearings 2—2, carried by the standards 3, secured to a base or frame 4.

An impeller 5 of a centrifugal pump is keyed by a key 6, or in any other way secured, to the shaft and may be rotated by means of a driving pulley 7 by any suitable source of power. The impeller 5 is formed of a number of radial vanes 5′, or of curved vanes like those in a reaction turbine wheel, and rotated in the direction indicated by the arrow in Fig. 2.

A casing or shell 8 incloses this impeller and is loosely mounted upon the shaft 1. It comprises two separate parts 9 and 9′, secured together by screw bolts 10. A pulley 11 is secured to or made integral with the part 9′ of the casing. This pulley will be hereinafter referred to as the "driven pulley".

The tubular portions 12 and 13 of the members 9 and 9′, composing the casing 8, are provided at their outer ends with stuffing boxes, suitable to hold packing material, held in position and adjustable by the glands 14 and 15, respectively. A plurality of vanes 16, similar to those of the runner of a reaction turbine, are secured to or made integral with the part 9 of the casing 8, and it will be observed that a rather heavy portion 17 forms the outer wall of the vanes. A corresponding portion 18 is arranged on the impeller 5. The purpose of these heavy portions is to act as a fly wheel, and at the same time as a gate, controlling the inlet of the vanes 16.

A bell crank 19 is fulcrumed at the bracket 20, secured to the standard 3, the arm 21 of which is connected to the casing 8, while its arm 22 forms an operating handle. By means of this lever the casing and the vanes, secured thereto, may be shifted axially from the position shown in full lines into the position shown in dotted lines in the drawings, the purpose of which will be hereinafter more fully described.

The casing is filled with a suitable fluid, such as water, glycerin, oil, mercury or any other suitable liquid, through the opening 23, closed by a plug 24.

Power is applied to the shaft 1 through the driving pulley 7, and rotates the impeller 5 in the direction of the arrow shown in Fig. 2. The casing 8 being filled with water and closed, it is obvious that the centrifugal force, due to the rotation imparted to the driving member or impeller 5, will force the water toward the periphery of the driven member or casing 8. The water entering the "eye" of the impeller rotates with the same and is forced toward the periphery through the vanes 5′ and enters the vanes 16 of the runner. The impeller is formed of a number of radial vanes 5′, or of vanes similar in construction to the vanes of a reaction turbine. As usual in centrifugal pumps the radius of the eye of the impeller is one half of the radius of the outer rim, and the area of the water way in the vanes is substantially constant. It is, of course, understood that according to the requirements, the impeller may be designed in other proportions, as for instance, the radius of the "eye" may be less or more than one half of the radius of the outer periphery of the impeller, and the area of the water way of the vanes might gradually increase or decrease toward the outer periphery.

It will be observed that the water enters the eye of the impeller with initial velocity, due to the circulation of the fluid in the casing. This initial velocity will be increased as the water passes the vanes and is forced outward by the rotation of the same. A velocity of whirl will be imparted to the fluid, and, on leaving the vanes, it will possess a considerable amount of kinetic energy, due to its velocity of whirl and its radial velocity.

The impeller, as described, is of great efficiency, since, as well known in hydraulics, a centrifugal pump possesses the greatest efficiency when placed close to the water, with as little suction as possible. In the construction described, the impeller is placed as close to the water as possible, i. e. into the water itself. The head or kinetic energy of the water, produced by the impeller is then utilized. A number of jets or streams will flow from the vanes 5′ of the impeller 5 to the vanes 16 of the runner; the pressure, which the jets or streams are capable of producing in the direction of their motion, will act upon the vanes and impart rotation and energy to the same and to the casing, to which they are secured or are made integral with.

The device may be defined as a reaction turbine, having rotatable guides, which produce mechanically the energy or head acting upon the runner of the turbine. It acts as a reaction turbine, since the runner is placed into the water, and, therefore, the flowing water is compelled to completely fill all the passages. The water, leaving the vanes 16 (its relative velocity being practically zero), enters again the impeller to start again its circle of rotation (shown by the arrows in the casing in Fig. 1).

As stated hereinbefore, the connection of the driving and driven members is not positive, therefore the velocity of the driving member will be gradually imparted to the driven member without shocks or jars. And for the same reason it will be impossible to overload the prime mover, rotating the driving member.

The speed of the driven member may be varied in two different ways, first by varying the speed of the prime mover and thereby varying the speed of the driving member, and, second, by changing the position of the driven member relative to the driving member in the direction of the axis of the shaft. In the position shown in full lines in Fig. 1, it might be said that the gate of the vanes is fully opened, while when operating the lever 19, and shifting thereby the casing 8 and the vanes 16, moving therewith, nearer to the driving pulley 7, the heavy portion 17 of the vanes will act as a gate, obstructing the inlet of the vanes 16, decreasing thereby the quantity of the water entering the vanes of the runner, and decreasing thus the speed of the same. In the position shown in dotted lines in Fig. 2, the outlet of the vanes 5' is entirely closed, no water will, therefore, enter the vanes 16 of the runner and its speed will be practically zero.

It will be observed that in decreasing the speed of the driven member 8, its torque will increase, since the torque is a function of the difference of the speeds of the impeller and runner.

There are innumerable uses to which this device can be put; for instance, in boats driven by high speed engines or turbines, where a large slow speed propeller is desired. It can be used on hoists, where it will adjust automatically the speed to the load and also admit of an easy control with no shocks to the cable. It may be used as a transmission for automobiles and motor vehicles, providing a perfectly flexible drive which can be applied to accelerate the vehicle either gradually or rapidly. It might also be used as a governor for prime movers, or for water-wheels, where it can actuate the gate.

What I claim is:

1. In a fluid gear, the combination of a fluid tight casing, a rotor or moving part in said casing adapted to rotate independent of said casing and forming a fluid circuit with said casing, a fluid, and means for causing, directing and controlling the flow of said fluid from the rotor or driving member to the casing or driven member in their plane of rotation and tangential to the circumference or circle of rotation of the rotor substantially as described.

2. The combination with a rotatable driving member, of a rotatable driven member containing said driving member, a liquid of constant volume contained in said driven member and adapted to transmit power from said driving member to said driven member, the driven member being longitudinally movable to produce changes in the speed of the driven part relatively to the driving part.

3. In a hydraulic power transmitting apparatus, the combination with a driving member, of a driven member, a closed casing for containing a liquid and secured to one of said members, and means suited to move said liquid in said driving member centrifugally and direct the same from said driving member to said driven member in the plane of rotation of said members, whereby the driven member is actuated.

4. The combination with a rotatable driving member, of a rotatable driven member containing said driving member, a liquid of constant volume contained in said driven member, and means on said driving member adapted to move said liquid in said driving member centrifugally and direct the same to said driven member in the plane of rotation of said members, whereby the driven member is actuated.

5. In a hydraulic power transmitting apparatus, the combination with a rotatable driving member, of a closed casing containing a liquid and inclosing said driving member, a driven member located within said casing and secured thereto, and means on said driving member adapted to move said liquid in the same centrifugally and direct the liquid to said driven member in the plane of rotation of the rotating members, whereby the driven member is actuated.

6. In a hydraulic power transmitting apparatus, the combination with a rotatable driving member, of a driven member adapted to rotate independently of said driving member, a casing inclosing said members and containing a liquid, a plurality of vanes on said driving member, a plurality of vanes on said driven member and located concentrically with the vanes of said driving member, the vanes of said driving member being adapted to direct liquid to the vanes of said driven member in the plane of rotation of said members, said driven member being attached to said casing.

7. In a hydraulic power transmitting apparatus, the combination with a driving member, of a closed casing containing a liquid and inclosing said driving member, a driven member located within said casing and secured thereto, means on said driving member adapted to gradually increase the velocity of said liquid toward the periphery and direct the same in the plane of rotation of said rotating members to said driven member.

8. The combination with a rotatable driving member, of a rotatable driven member containing said driving member and being capable of longitudinal movement relatively to said driving member, and a liquid of constant volume contained in said driven member and adapted to transmit power from said driving member to said driven member.

9. The combination with a rotatable shaft, of a driving member secured thereto, a driven member comprising a casing loosely mounted on said shaft and being capable of longitudinal movement relative to the driving member, and fluid means contained in said casing and adapted to impart the rotation of said driving member to said driven member.

10. The combination with a rotatable shaft, of a driving member secured thereto, a rotatable driven member containing said driving member and being loosely mounted on said shaft and adapted to rotate independently of said driving member, said driven member being capable of longitudinal movement relative to said driving member, and a fluid contained in said casing and adapted to impart the rotation of said driving member to said driven member.

11. The combination with a driving member, of a driven member, liquid means adapted to impart the rotation of said driving member to said driven member, means adapted to vary the speed of said driven member, said driven member being capable of longitudinal movement relative to the driving member, and means to shift the driven member relatively to the said driving member.

12. The combination with a closed casing containing a confined volume of liquid, a shaft rotatably mounted therein, an impeller keyed to said shaft, a turbine-wheel located within said casing and secured thereto, the vanes of said impeller and the vanes of said turbine-wheel being located concentrically.

13. In a hydraulic power transmitting apparatus, the combination with a driving member, of a driven member, a closed casing containing a liquid and secured to one of said members, means suited to move said liquid in said driving member centrifugally in a direction which has a radial component and direct the same from said driving member to said driven member, whereby said driven member is actuated, and means for controlling the amount of liquid flowing to said driven member.

14. The combination with a rotatable driving member, of a rotatable driven member containing said driving member, a liquid of constant volume contained in said driven member, means on said driving member adapted to move said liquid in said driving member centrifugally and direct the same to said driven member in the plane of rotation of said rotatable members, whereby said driven member is actuated, and means for controlling the amount of liquid flowing to said driven member.

15. In a hydraulic power transmitting apparatus, the combination with a rotatable driving member, of a closed casing containing a liquid and inclosing said driving member, a driven member within said casing and secured thereto, means on said driving member adapted to move said liquid in the same centrifugally in a direction which has a radial component and direct the liquid to said driven member, whereby the driven member is actuated, and means for controlling the amount of liquid flowing to said driven member.

16. In a hydraulic power transmitting apparatus, the combination with a driving member, of a closed casing containing a liquid and inclosing said driving member, a driven member located within said casing and secured thereto and adapted to rotate independently of said driving member, a plurality of impelling vanes on said driving member, a plurality of vanes on said driven member, the vanes of said driving member being adapted to direct liquid in a direction which has a radial component to the vanes of said driven member, whereby the driven member is actuated, and means for controlling the amount of liquid flowing to said driven member.

17. In a hydraulic power transmitting apparatus, the combination with a driving member, of a closed casing adapted to contain a liquid and inclosing said driving member, a driven member located within said casing and secured thereto, means on said driving member adapted to gradually increase the velocity of said liquid toward the periphery and direct the same to said driven member, and means for controlling the amount of liquid flowing to said driven member.

18. The combination with a closed casing containing a confined volume of liquid, of a turbine wheel located therein and secured thereto, an impeller located in said casing and adapted to direct liquid in a direction which has a radial component to said turbine-wheel, whereby the same is actuated, and means for controlling the amount of liquid flowing to said turbine-wheel.

19. In a hydraulic transmitting apparatus, the combination with a driving member, of a driven member inclosing said driving member, a liquid contained in said driven member, means carried by said driving member and adapted to create a fluid pressure and direct the fluid under pressure in a direction which has a radial component to said driven member, whereby the same is actuated, and means for controlling the amount of liquid flowing to said driven member.

20. The combination with a closed casing containing a confined volume of liquid, of a turbine-wheel located therein and attached thereto, an impeller located within the said casing in the plane of said turbine-wheel and adapted to direct said liquid to said turbine-wheel, whereby the same is actuated.

21. The combination with a closed casing containing a confined volume of liquid, a turbine-wheel located therein and secured thereto, an impeller located in said casing in the plane of said turbine-wheel and adapted to direct liquid to said turbine-wheel, whereby the same is actuated.

22. The combination with a closed casing containing a confined volume of liquid, of a shaft rotatably mounted therein, an impeller fixedly secured to said shaft, a turbine-wheel located in the plane of said impeller in said casing and attached to the latter, said impeller being adapted to direct liquid to said turbine-wheel, whereby the same is actuated.

23. In a hydraulic transmitting apparatus, the combination with a driving member, of a driven member inclosing said driving member, a liquid contained in said driven member, means carried by said driving member and adapted to create a fluid pressure and direct the fluid under pressure to said driven member in the plane of rotation of said member and tangentially to the periphery of the driving member whereby said driven member is actuated.

24. In a hydraulic power transmitting apparatus, the combination with a rotatable driving member, of a rotatable driven member, a casing inclosing said rotatable parts and containing a liquid, means on said driving member adapted to impart a rotary motion to said liquid and direct the same to the driven member in the plane of rotation of said members and tangentially to the periphery of the driving member whereby said driven member is actuated, said driven member being attached to said casing.

25. The combination with a closed casing containing a liquid, of a shaft rotatably mounted therein, an impeller fixedly secured to said shaft, a turbine-wheel located in said casing and attached thereto, said impeller being adapted to direct liquid to said turbine-wheel in the plane of rotation of said wheels and tangentially to the periphery of said impeller, whereby said turbine-wheel is actuated.

Signed at New York, in the county of New York and State of New York, this 26th day of June, A. D. 1907.

CARLTON R. RADCLIFFE.

Witnesses:
OSCAR P. LEWIS,
S. BIRNBAUM.